Barton G. Siebring
INVENTOR.

Barton G. Siebring
INVENTOR.

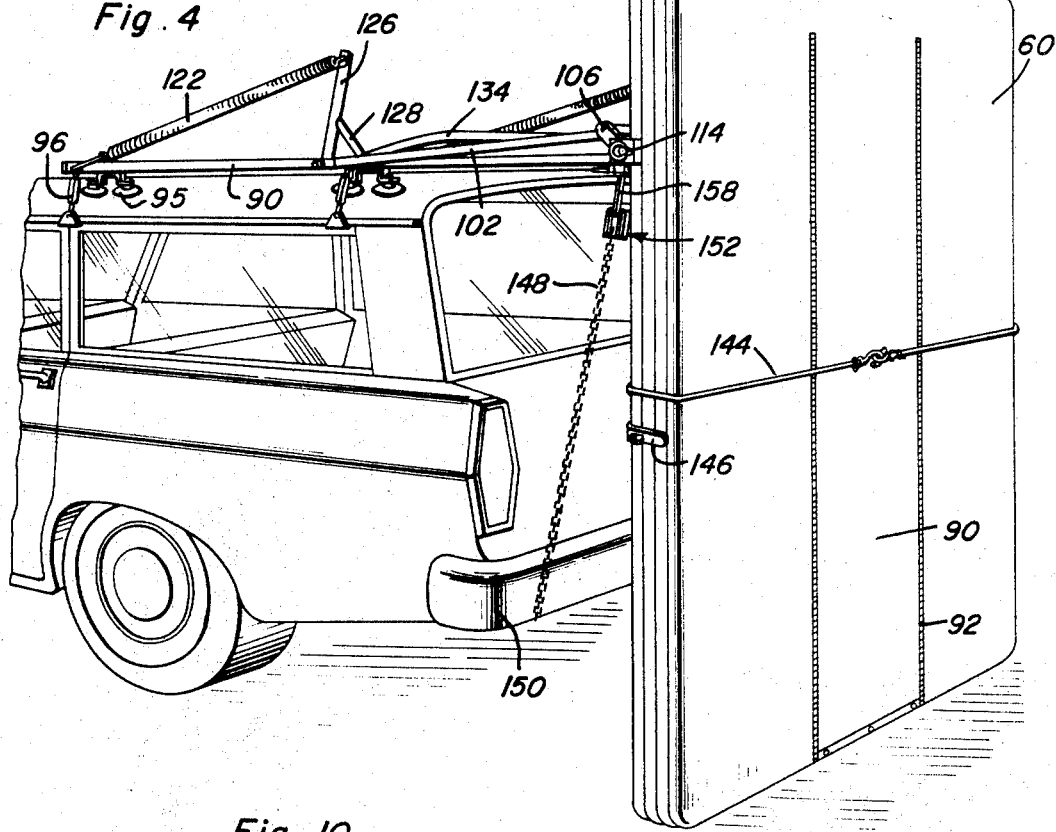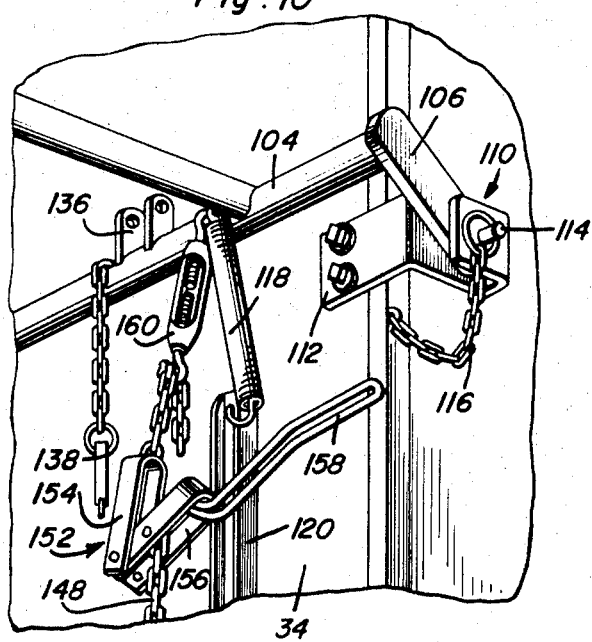

Oct. 14, 1969     B. G. SIEBRING     3,472,252
COLLAPSIBLE CAMPER

Filed April 27, 1967     6 Sheets-Sheet 4

Barton G. Siebring
INVENTOR

Oct. 14, 1969

B. G. SIEBRING 3,472,252

COLLAPSIBLE CAMPER

Filed April 27, 1967

Barton G. Siebring
INVENTOR.

BY *Clarence A. O'Brien*
and *Harvey B. Jacobson*
Attorneys

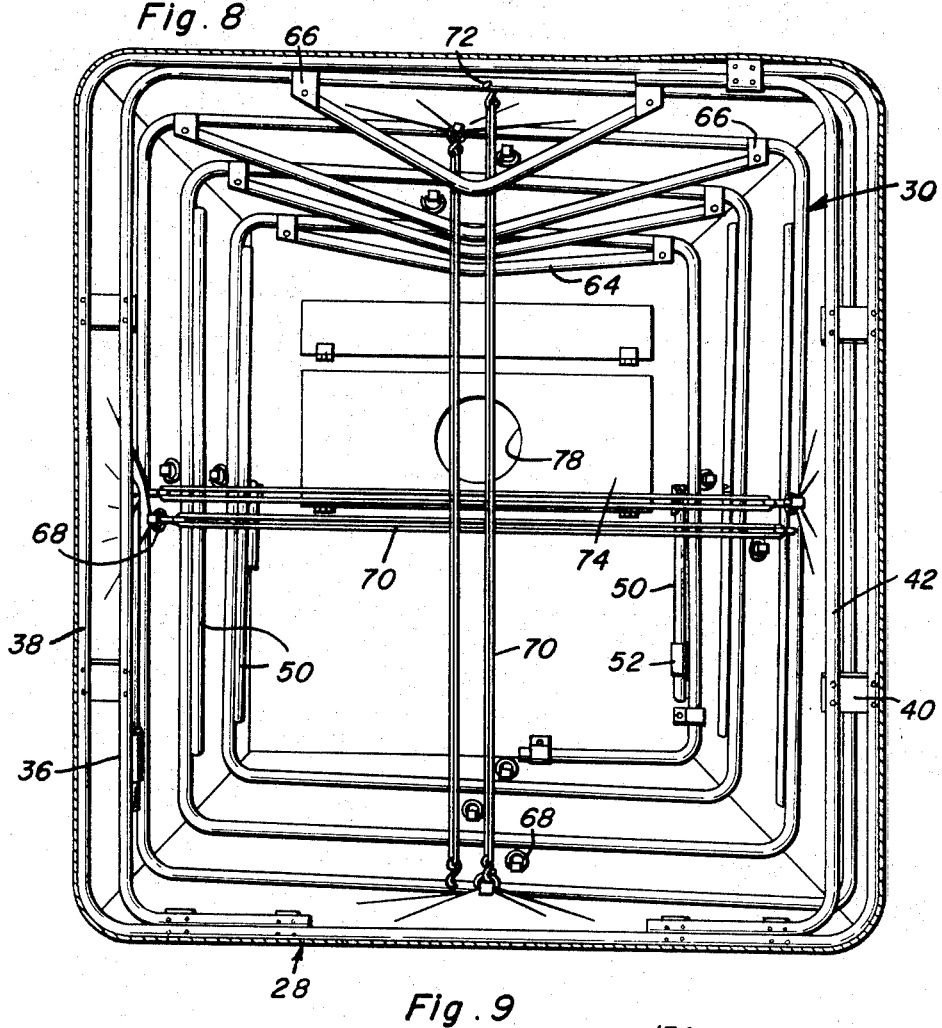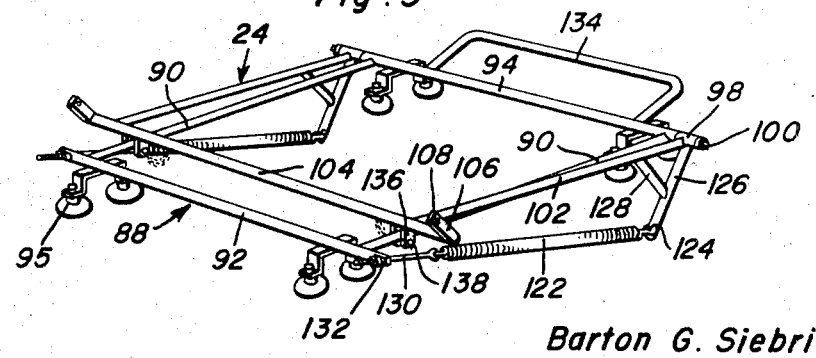

United States Patent Office 3,472,252
Patented Oct. 14, 1969

3,472,252
COLLAPSIBLE CAMPER
Barton G. Siebring, McAllen, Tex.
(1656 Waterbury Drive SE., Grand Rapids, Mich. 49508)
Filed Apr. 27, 1967, Ser. No. 634,145
Int. Cl. E04b 1/347; A45f 1/16; E04f 10/10
U.S. Cl. 135—1
8 Claims

ABSTRACT OF THE DISCLOSURE

A collapsible enclosure which, through a counterbalanced carrier unit, is movable between a first completely collapsed position atop a vehicle and a second expanded or erected position supported on the ground to the rear of the vehicle. The collapsible frame of the enclosure comprises a spiralling tubular member capable of having the convolutions either collapsed completely against each other or expanded a substantial distance apart and rigidly locked in the expanded position so as to define a living area. The tubular frame is covered with canvas whereby, when expanded, a sheltering enclosure is formed.

---

The instant invention is generally concerned with camping apparatus, and more particularly relates to a camper or tent-like enclosure which is capable of being carried in a completely collapsed condition directly on the roof of an automobile, preferably although not necessarily a station wagon type vehicle.

It is a primary object of the instant invention to provide a camper which, through the unique structural frame thereof, can be collapsed into a small unit capable of being compactly stored on a vehicle roof, while at the same time expanding, in a manner of minutes, to a fully erected, rigid and highly stable enlarged enclosure which, as an example, may be six feet wide, six and one-half feet high, and up to thirty feet long.

In conjunction with the above object, it is a significant object of the instant invention to provide a camper wherein the erection process requires only the swinging of the counterbalanced collapsed unit from the top of the car, the engaging of a holddown hook so as to anchor the now ground supported unit, physically pulling the collapsed camper rearward of the vehicle for effecting an expansion thereof, and locking several quick fit side rail sections together, the entire operation requiring no tools and very little labor and time.

Also of particular significance with regard to the storage of collapsed unit on the roof of a vehicle, is the incorporation of counterbalanced means so as to enable the raising and lowering of the unit in a highly simplified manner.

In devising a unit which can be carried on the roof of a vehicle, while at the same time expanding into a relatively large livable area, it is intended that a camper be provided which eliminates the necessity of requiring a trailer or the like as is now normally required if a quick erect enlarged unit is to be provided. Along these same lines, the convenience of the enlarged living area is provided in a manner which does not eliminate the usable area within the vehicle itself, this providing a substantial degree of freedom to the automobile passengers, which, in conjunction with the elimination of a trailing vehicle, provides for a freedom not heretofore available on camping trips.

Another object of the instant invention is to provide a camper which, while mounted on and anchored to an automobile is capable of being completely detached therefrom when erected so as to allow for a free use of the vehicle itself.

Basically, the camper of the instant invention is to include a spiralling aluminum tube frame which possesses a degree of resiliency capable of enabling a collapsing of the frame with the convolutions in abutting overlying engagement with each other, thereby producing a collapsed unit of a thickness equal to the combined thicknesses of the convolutions, and an expanding wherein the convolutions are spaced a substantial distance from each other so as to define a livable enclosure which is completed by an enclosing canvas cover permanently affixed to the frame and collapsible therewith. In addition, the structure of the instant invention incorporates a unique carrier and counterbalancing unit which enables the transfer of the collapsed camper from the loaded position atop the vehicle to a ground supported position for erection.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a perspective view illustrating another step in the camper unloading sequence wherein the collapsed camper is now ground supported to the rear of the vehicle;

FIGURE 8 is a view similar to FIGURE 7 with the camper prepared for collapsing so as to insure a proper folding of the canvas;

FIGURE 9 is a perspective view of the carrier and camper positioning unit with the collapsible tent-like unit removed;

FIGURE 10 is a perspective detail illustrating a portion of the anchoring structure, as well as the means for locking the collapsible enclosure to the carrier unit;

Figure 1:
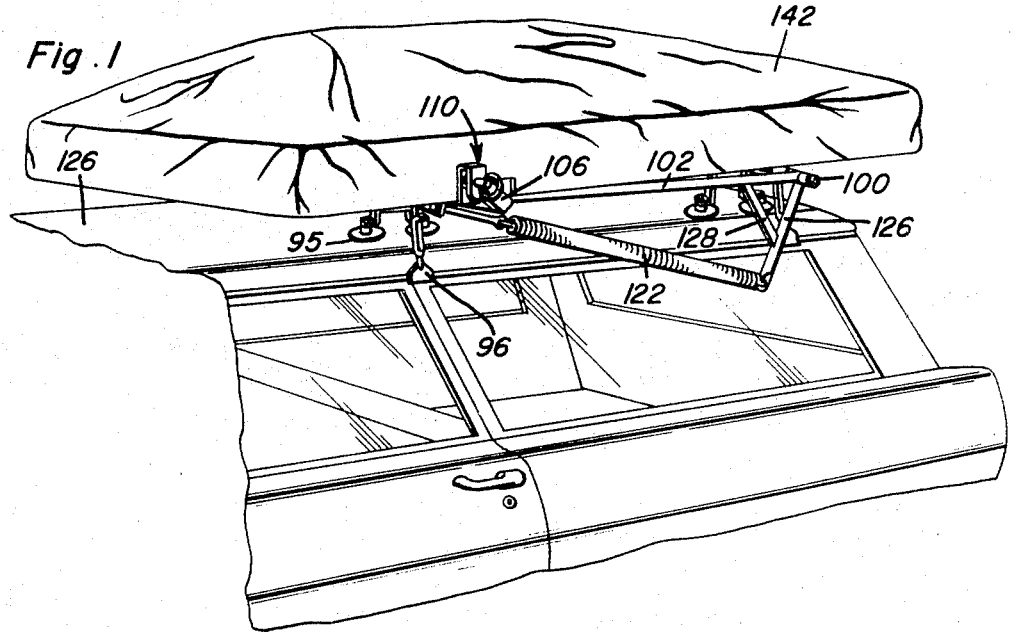
FIGURE 1 is a perspective view of the collapsible camper in its loaded and covered position on a vehicle.

Referring now more specifically to the drawings, reference numeral 20 is used to generally designate the camper comprising the instant invention. This camper 20 includes basically the actual collapsible enclosure or tent-like unit 22 and the combination carrier and positioning unit 24 which is mounted directly on the roof 26 of an automobile or the like.

The enclosure unit 22 includes, in addition to the outer cover 28, preferably of canvas or the like, a tubular supporting framework, preferably of aluminum tubing so as to combine strength and structural rigidity with lightness. The main portion of the framework comprises an elongated spiralling tubular member 30 having a series of rectangular convolutions which in each instance define the approximate width and height of the enclosure 22 to be formed. The forwardmost convolution 32, this being the convolutions nearest the conveying vehicle or automobile 26, is rigidly affixed to a rigid plywood or the like end wall panel 34. The rearmost convolution or partial convolution 36 is in turn rigidly affixed to a surrounding rectangular tubular frame 38 through a series of connector plates 40 for combining therewith and defining a planar rigid end wall frame. Noting FIGURE 6 in particular, it will be appreciated that an additional vertical brace 42 has been provided between the upper and lower bars of the frame 38 in opposed relation to the vertical leg of the rearmost convolution 36, thereby assisting in the rigidification of this rear wall defining construction.

The tubular spiralling member 30 is to, through the nature of the tubular aluminum itself, contain a sufficient degree of inherent flexible resiliency so as to enable a complete longitudinal collapsing of the convolutions on each other against the forward end wall panel 34 with the convolutions, aside from the canvas cover 28 secured thereto, actually contacting and engaging each other whereby a collapsed unit of a thickness equal to the combined thicknesses of the convolutions, end wall panel 34 and intermediate canvas portion is achieved. By the same token, the nature of the spirally defined member 30 is to be such so as to enable a longitudinal separation of the convolutions in a manner which will be readily appreciated from FIGURE 6 of the drawings in particular. In expanding the convolutions, it will be appreciated that the upper and lower convolution bars 44 and 45 will, while remaining parallel to each other and generally horizontal, be angularly orientated relative to the longitudinal axis of the enclosure 22, the opposed vertical bars 46 at the same time inclining forwardly along one side and rearwardly along the other side in opposed parallel vertical planes. As an example of the relative sizes between a collapsed and an erected camper enclosure 22, the unit illustrated in the drawings will have a depth of approximately six inches when collapsed and will have an erected depth of approximately 18 feet 6 inches.

Figure 6:
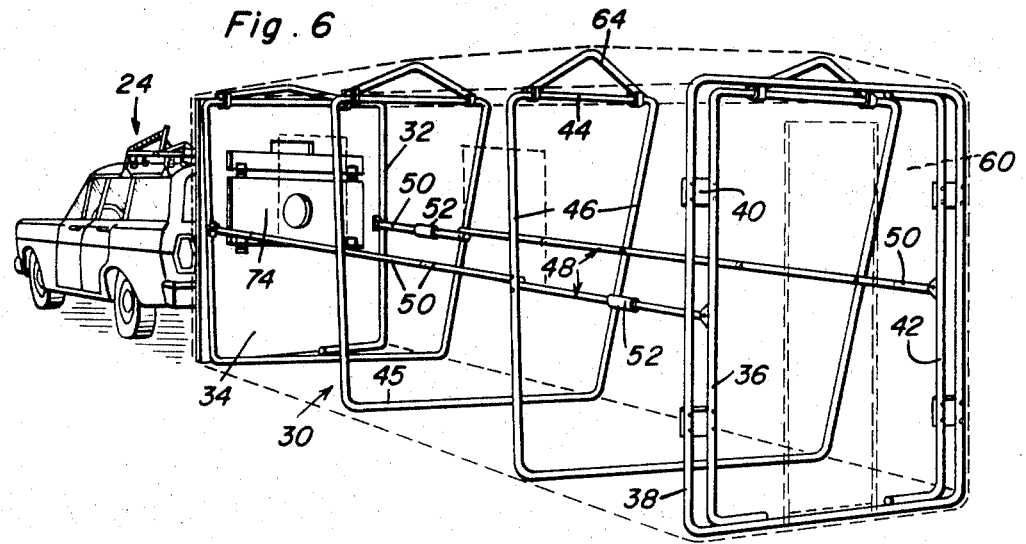
FIGURE 6 is a perspective view of the erected camper with the canvas removed so as to expose the erected supporting framework.
Figure 12:
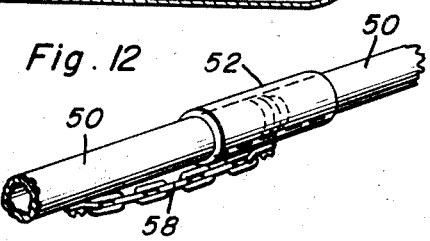
FIGURES 11 and 12 are sequential perspective details illustrating the manner in which the side rails are finally interlocked in canvas stretching position.
Figure 11:
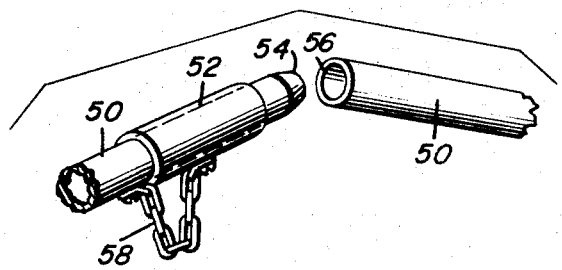

In order to maintain the rectangular convolutions of the member 30 in their expanded position, and at the same time brace this member 30 which constitutes the major portion of the framework of the enclosure 22, a pair of opposed side rails or braces 48 are provided. These side rails 48 are sectional in nature, each comprising a plurailty of sections 50 which telescopically or otherwise releasably interlock so as to define a rigid linear unit affixed to each of the convolutions of the member 30 upon a complete expansion thereof. The side rail sections 50 associated with each side rail 48 are each pivotally mounted on one of the convolutions at approximately mid-height whereby, upon a release from the adjacent rail sections 50, the sections can be pivoted so as to parallel the corresponding convolutions and lie closely thereagainst as suggested in FIGURE 8, these side rails 50 thereby being compactly received within the collapsed unit without requiring a complete removal therefrom. Incidentally, it will be noted from FIGURES 6-8 that the forwardmost rail sections 50 are actually pivotally affixed, for matters of convenience, to the inner face of the front end wall panel 34, while the rearmost section 50 of the far side rail 48 in FIGURE 6 is actually pivotally affixed to the vertical frame brace 42. Finally, each of the side rails 48 is to have a pair of adjacent end sections 50 which are to be interconnected in the manner suggested in FIGURES 11 and 12, utilizing a sliding joint locking sleeve 52. Again referring to FIGURE 6, it will be appreciated that this particular section joint is provided between the opposite endmost pair of sections on the side rails 48. Basically, all of the rail sections 50 of each side rail 48 are interlocked except for the two adjacent end sections 50 which are as illustrated in FIGURES 11 and 12. In this manner, there will be no difficulty in interlocking the rail sections 50, even assuming a straight telescopic fit, in that the convolutions are free to move relative to each other in an obvious manner. Once all the other sections 50 have been interconnected, the two end sections of FIGURES 11 and 12 have the adjacent ends, one being a rounded camming end 54 and the other being a socketed end 56 therefore, angularly brought together and forced into linear alignment so as to in effect force the end 54 into the socket 56 while at the same time rigidly tensioning the canvas covering 28 between the front end wall 34 to which one end of the canvas cover is secured and the rear frame to which the rear end of the cover 28 is secured. Upon linear alignment of the final two sections, the sleeve 52 is slid over the joint whereby any disruption of the linear connection therebetween is precluded. Incidentially, it will be noted that the sleeve 52 is affixed to the particular section 50 upon which it is mounted by a flexible retaining chain 58, thus avoiding a possibility of the sleeve 52 being misplaced or lost. In synopsis, the canvas cover 28, which includes a rear end wall 60, is secured at one end to the front end wall panel 34 and at the other end to the rear end wall defining frame 38 and rear convolution 36, and is freely received over the intermediate convolutions so as to enable these intermediate convolutions to move relative to the cover 28. The convolutions in erecting the enclosure are initially longitudinally spaced from each other and the side rail sections 50, aside from one pair of end sections, are interlocked through suitable joint forming means between the adjacent ends thereof, this being facilitated by the free manner in which the intermediate convolutions can be manipulated. Finally, the last two sections are cammed into engagement with each other as suggested in FIGURES 11 and 12 and rigidly interlocked by the enclosing sleeve 52, this final camming of these last two sections into position stretching the canvas cover 28 to a taut condition eliminating any sagging or the like and compressively retaining the rail sectons 50 interengaged with each other until the sleeves 52 on the opposed rails 48 are retracted from their corresponding joints and the corresponding adjacent sections 50 cammed out of engagement with each other.

Figure 7:
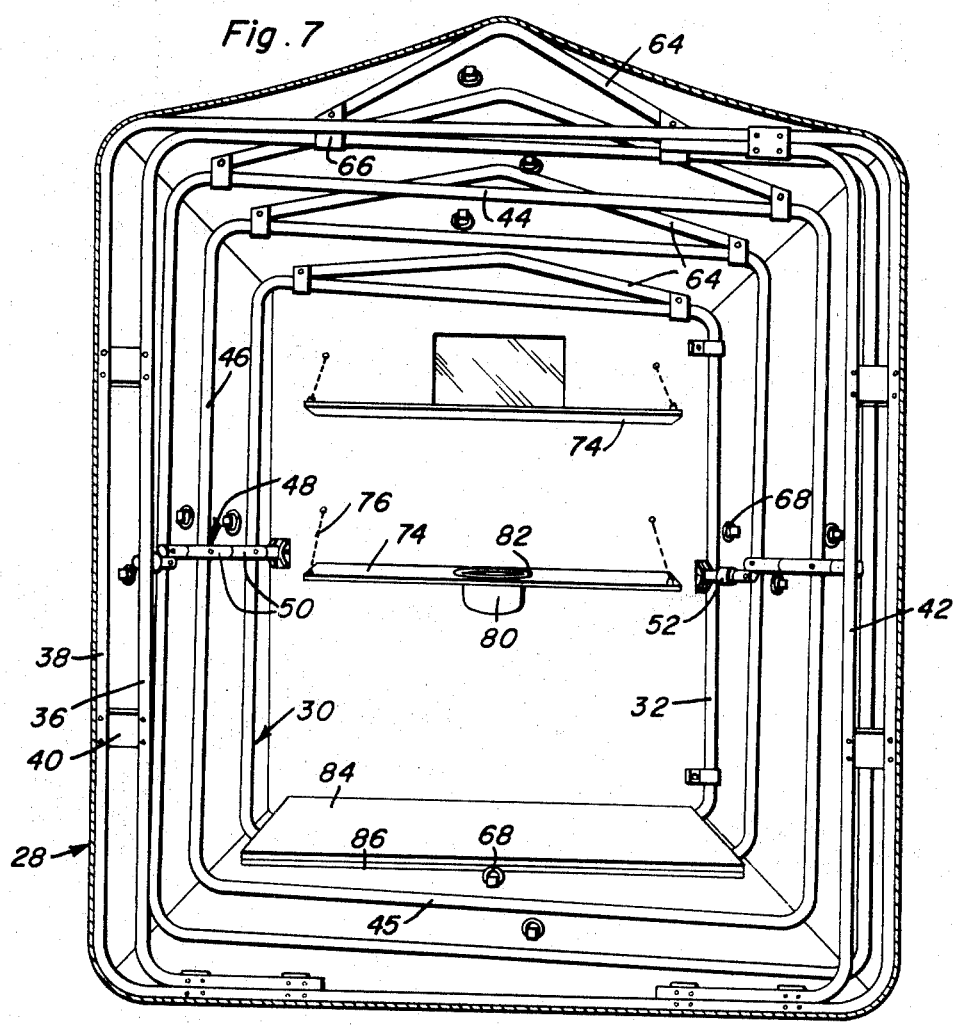
FIGURE 7 is an enlarged rear perspective with the rear panel of the canvas cover removed.

It is contemplated that the roof forming portion 62 of the canvas cover 28 be peaked so as to allow for a run-off of rain. This is achieved by providing angularly deformed roof bars 64 rotatably affixed to the upper cross bar 44 of each of the intermediate convolutions. These ridge defining bars 64 are movable between a first ridge defining position as illustrated in FIGURE 7 wherein they peak upwardly, and a second enclosure collapsing position rotated downwardly so as to depend from the corresponding cross-bars 44 as illustrated in FIGURE 8. It will of course be appreciated that the rotational engagement of the opposed ends of each of the ridge defining bars 64 is such so as to enable a selective locking of these bars 64 in the elected position of FIGURE 7, either by a positive mechanical lock or through a development of a frictional resistance to rotation through a snug fit of the corresponding cross-bar 44 into the sleeve-like connector 66.

Inasmuch as the canvas cover 28 is to remain on the framework when collapsed, it is important that this canvas cover 28 fold properly so as to define a neat compact collapsed unit with no projecting canvas flaps or the like which might be damaged. Accordingly, various metal hook receiving loops 68 are affixed to all of the interior surfaces of the canvas cover 28 and a plurality of elongated elastic straps 70 are engaged between either opposed ones of these loops 68 or between a loop 68 and a hook receiving portion of an opposed structural member, the elastic strap 70 having quick-release hooks 72 affixed to the opposite ends thereof. In this manner, as the tension on the canvas cover 28 is released on a collapsing inward movement of the convolutions toward each other, the wall, ceiling and floor portions of the canvas cover are automatically pulled inwardly in response to the contraction of the elastic strap 70, thus in effect collapsing the cover 28 laterally into the longitudinally collapsing convolutions so as to produce the neat smooth edged collapsed unit illustrated in FIGURES 3 and 4. It will be appreciated that the hooking up of the elastic collapsing strap 70 can be effected in a matter of a few minutes with these straps, if so desired, being permanently hung from one point of engagement and merely temporarily held to the side when the enclosure is being used. Further, the specific orientation of the strap receiving rings 68 will be such so as to insure the desired collapsing of the canvas cover 28, this normally requiring a strap receiving ring between each pair of convolutions on the opposed walls, the ceiling and the floor as illustrated.

The front end panel 34 will have what might be considered a kitchen unit mounted thereon, this comprising in effect a pair of pivotally mounted shelves 74 in conjunction with straps or the like 76 for maintaining the shelves 74 in a horizontal position. Upon a collapsing of the enclosure 22, these shelves 74 will be pivoted upwardly so as to lie flat against the inner face of the panel 34. The lowermost one of the shelves 74 will include a central aperture 78 therethrough for the removable reception of a sink-forming pan 80 having a laterally extending peripheral flange 82 which retains the pan within the receiving apertures 78.

It is also contemplated that plywood floor panels 84 be provided so as to define an elevated smooth floor for the enclosure 22, these panels 84 including depending support strips 86 which allow for a spanning of the bottom convolution cross-bars 45 and provide a stable supporting of the panels 84 on the ground overlying canvas floor. Upon collapsing of the enclosure 22, these panels 84 can be positioned flush against the end panel 34 so as to not interfere with the collapsing framework, and by the same token be received compactly therewithin. Finally various selectively openable windows 88 and an entrance door 90 can be provided, the door 90 being provided within the end canvas wall 60 and including opposed full height slide fasteners 92 for a sealing thereof.

Turning now to the carrying and positioning unit 24, it will be noted that such includes a roof mounted rectangular frame 88 having opposed side bars 90, a forward bar 92 and a rear bar 94. The frame 88 is to be mounted on the roof of the vehicle 26 toward the back end of the car through suitable roof engaging means such as the suction cup feet 95 and appropriate gutter engaging tie down clamps 96, much in the manner of a convention luggage rack. The opposed ends of the rear bar 94 of the frame 88 project laterally beyond the corresponding side bars 90 and each have a rotatably mounted sleeve 98 thereon, an appropriate end cap 100 or the like being provided so as to actually retain each of the sleeves 98 on the projecting ends of the bar 94. Rigidly affixed to each of the sleeves 98 and projecting laterally therefrom generally parallel and just outward of the frame side bars 90 are a pair of arms 102 which in turn terminate, at their outer ends, in a transverse bar or rod 104. The rod 104 is affixed rigidly to the ends of the arms 102 and projects laterally beyond both ends thereof with each of the projecting ends of the rod 104 having an outwardly angled rigid mounting ear 106 rigid therewith. With the arms 102 orientated as illustrated in FIGURE 9, overlying the roof mounting frame 88, the mounting ears 106 project upwardly and forwardly at approximately a 45° angle. The free end portions 108 of each of the mounting ears 106 are in turn rotatably received within a pair of opposed U-shaped brackets 110 affixed to the enclosure end panel 34 through, in each instance, a laterally directed flange 112 bolted directly to the panel 34. These brackets overlie the side edges of the panel and rotatably secure the end portions 108 of the mounting ears 106 by means of a removable pivot pin 114, noting FIGURE 10 in particular. The pin 114 associated with each bracket 106 and mounting ear 106 is removable so as to allow for a free standing of the enclosure 22 and a release of the vehicle therefrom as shall be explained in more detail subsequently. Accordingly, the pin 114, in order to avoid its loss, is affixed to an adjacent portion of the panel 34 through an elongated flexible chain or the like 116.

Figure 2:
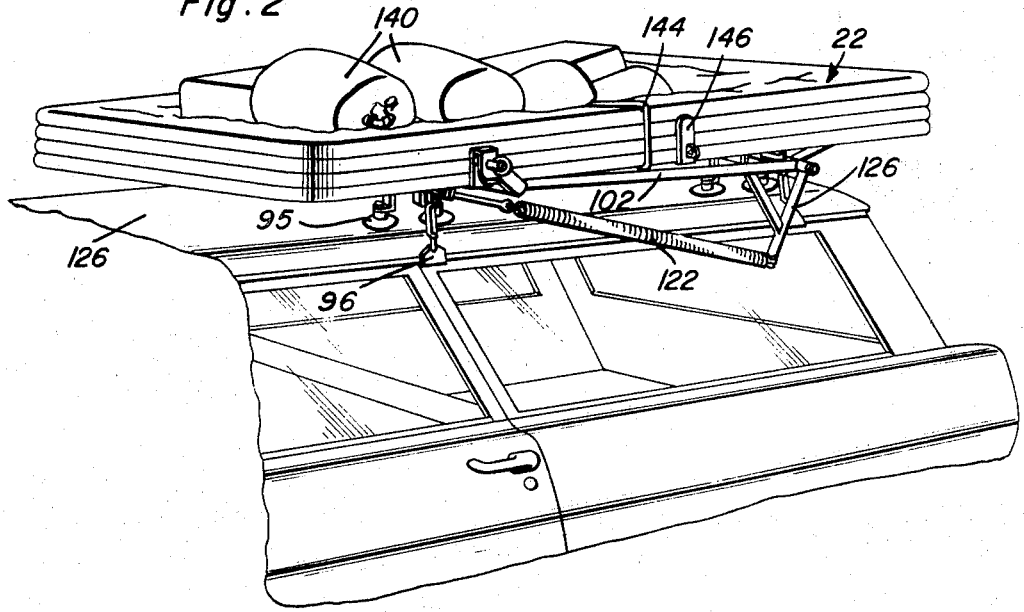
FIGURE 2 is a view similar to FIGURE 1 with the storage cover removed illustrating the manner in which accessories can be loaded into the collapsed camper for storage therewith.
Figure 3:
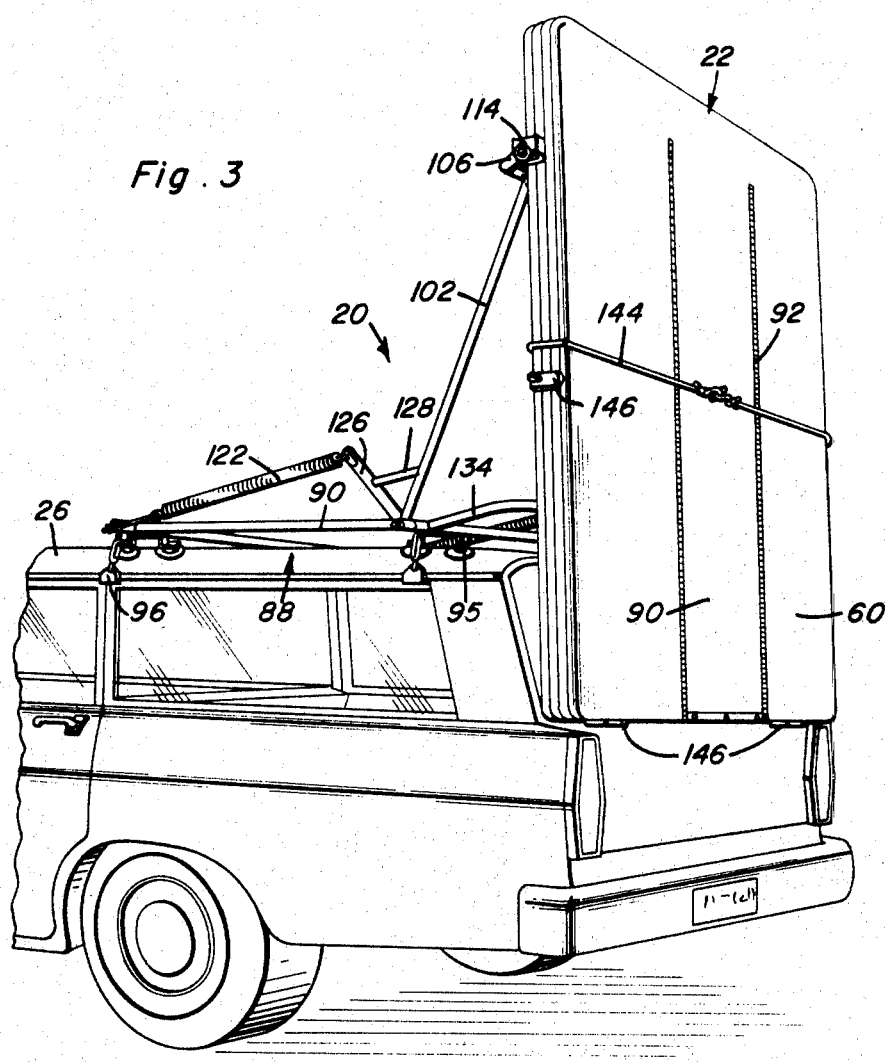
FIGURE 3 is a perspective view illustrating a step in the unloading operation of the camper.

With the mechanism just described, and upon a comparison of FIGURES 2, 3 and 4, it will be appreciated that the rigid front end enclosure panel 34, along with the entire collapsed enclosure mounted thereon, can be easily swung from a horizontal position overlying the carrier frame 88 to a vertical position standing on the ground rearward of the vehicle, the positioning arms 102 rotating about the laterally extending ends of the rear frame bar 94 while the end panel 34 swings outwardly about the pivotal engagement of the mounting brackets 110 thereon with the mounting ears 106 associated with the cross-rod 104 affixed to the ends of the arms 102. Nothing FIGURE 10 again, one of a pair of coiled tensioned springs 118 has been illustrated as affixed to and depending from the rigid cross rod 104. The two springs 118, located at opposite ends of the rod 104, are used to hold chains 148 and the associated elements, which will be described subsequently, in a neat manner when collapsing the structure. The left spring will hold the right chain and vice versa. FIGURE 10 also illustrates an elongated panel bracing member 120 affixed vertically along the rear surface of the panel 34.

In order to further facilitate the manipulation of the structure, which is extremely light due to the unique design and the use of aluminum tubing, weighing generally less than two hundred pounds, a pair of opposed counterbalancing coiled springs 122 are provided. Each of the springs 122 has a first end thereof affixed to the free end 124 of a secondary arm 126 rigidly affixed to one of the sleeves 98 and extending rearwardly or below the corresponding arm 102 at a diverging angle thereto. This secondary arm 126 is to be further rigidified by a cross-brace 128 extending between the secondary arm 126 and the corresponding elongated panel swinging arm 102. The opposite or forwardmost end of the corresponding counterbalancing spring 122 is, through a rod extension 130, pivotally affixed to an extending end portion 132 of the front frame bar 92 with the compressive nature of the springs 122 tending to move the secondary arm 216 to the horizontal from either the position illustrated in FIGURE 9 or the position of FIGURES 3 and 4. It is contemplated that the counterbalancing force developed in these springs 122 be sufficient so as to counterbalance a major portion of the weight of the collapsed enclosure unit 22, thereby requiring only little effort on the part of the user in swinging the collapsed enclosure from the car to the ground or from the ground back onto the car.

When the collapsed enclosure 22 is supported horizontally over the vehicle 26, it will be noted that the forward portion thereof is in a slightly raised position due to the upwardly angled orientation of the mounting ears 106. In order that the collapsed unit might ride horizontally, a U-shaped rear upwardly angle support brace 134 is rigidly affixed to the rear frame cross-bar 94 for the reception of the rear portion of the horizontally orientated rigid end panel 34. This rear supporting brace 134 also provides a convenient cross-bar upon which the enclosure support panel 34 can be turned in moving from the horizontal to the vertical or vice versa.

In order to lock the positioning frame, consisting of the arms 102, cross-rod 104 and mounting ears 106, with the associated collapsed unit 22 to the mounting frame 88, two pairs of projecting ears, noting FIGURES 9 and 10, are affixed to the cross-rod 104 for reception of the frame side bars 90 therebetween. Once each pair of ears 136 is received about the corresponding frame bar 90, a removable lock pin 138 is extended therebetween beneath the corresponding bar 90, this in turn effectively locking the cross-rod 104 to the mounting frame 88 and retaining the collapsed unit 22 in a horizontal position thereon.

Noting FIGURES 1 and 2, it will be appreciated that the collapsed camper 20 can accommodate, within the confines of the collapsed framework, camping equipment or the like 140, much in the manner of a luggage rack, with the entire unit and equipment 140 being subsequently enclosed by a removable cover 142. Incidentally, as will be appreciated from FIGURES 3 and 4, the collapsed unit 22 will preferably have a suitable tie strap or rubber rope 144 engaged thereabout so as to retain the collapsed unit in its most compact position. Further, opposed rearwardly directed guide plates 146 may be affixed to the opposed edges of the front panel 34 as well as the lower edge thereof so as to assist in the nesting of the canvas covered frame convolutions against the rear face of the panel 34 in an obvious manner.

With reference to FIGURE 4, once the collapsed unit 22 is positioned vertically on the ground to the rear of the vehicle, one or more tensionable holddown cables or chains 148 are engaged, normally through releasable hooks, between the frame of the vehicle, around the bumper 150 or the like, and the cross-bar 104 attention being also directed to FIGURE 10 for further details.

Upon a tensioning of the chain or chains 148, the rigid front panel is solidly positioned in a vertical orientation on the ground so as to enable, upon release of the restraining strap 144, an expansion of the canvas covered spiral frame member 30 so as to effect an erection of the enclosure unit 22. The actual tensioning of each of the chains 148 is effected through a chain tightener 152 including a pair of nestable pivotally interconnected U-shaped links 154 and 156 interposed along the length of the chain 148 and selectively movable from an open position to a closed position wherein the small link 156 is nested within the larger link 154 with the adjacent chain end positioned beyond center relative to the pivotal connection between the links 154 and 156 so as to require a positive physical separation of the links for a release of the tension on the chain 148. It will be noted that an elongated offset control handle 158 is provided on the smaller link 156, the offset in the handle 158 allowing for a past center nesting of the smaller link 156 within the larger link 154. Furthermore, in order to allow for an accommodation of different height vehicles or the like, an appropriate turnbuckle device 160 can be hooked between any one of a plurality of links at the upper end of the chain 148 and the cross-bar 104, all of this structure being readily appreciable from FIGURE 10.

Upon a complete expansion of the enclosure 22 and a locking of the side rails 48 in a canvas stretching position, the enclosure 22 becomes self-supporting and, upon a pulling of the positioning frame retaining pins 114 which secure the mounting ears 106 to the panel 34, the entire mounting and positioning unit 24 can be collapsed back onto the vehicle, as suggested in FIGURE 9, and the vehicle moved away from the free standing enclosure unit 22 for use as desired, this of course also involving a disengagement of the stabilizing chains 148 utilized in the expansion of the enclosure unit 22. The re-engagement of the vehicle and the enclosure unit 22 merely involves an alignment of the ears 106 within the corresponding brackets 110, and a reinsertion of the pivot defining pins 114.

Figure 13:
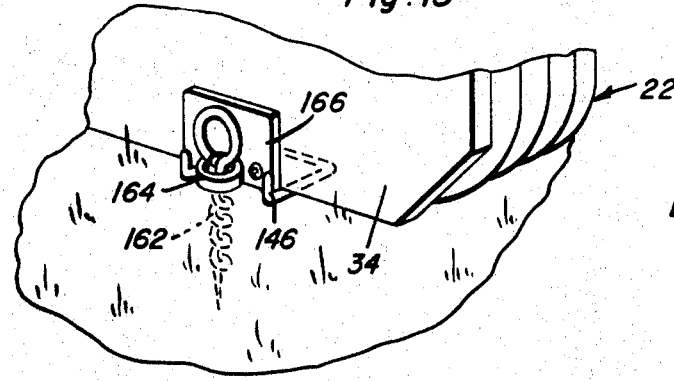
FIGURE 13 is a perspective detail illustrating an auxiliary ground anchor.

With regard to the detail of FIGURE 13, it is intended that provision also be made at both ends of the expanded enclosure unit 22 for accommodating hand manipulated ground anchors 162. Such means will preferably be in the nature of anchor receiving rings 164 bolted or otherwise affixed, through appropriate mounting plates 166 to the front panel 34 and the rearmost rectangular frame 38 or convolution 36. These anchors 162 will not normally be required because of the highly rigid and stable nature of the structure. However, such anchors may be useful during extremely high winds, especially when the enclosure unit 22 is left free standing away from the vehicle.

Figure 5:
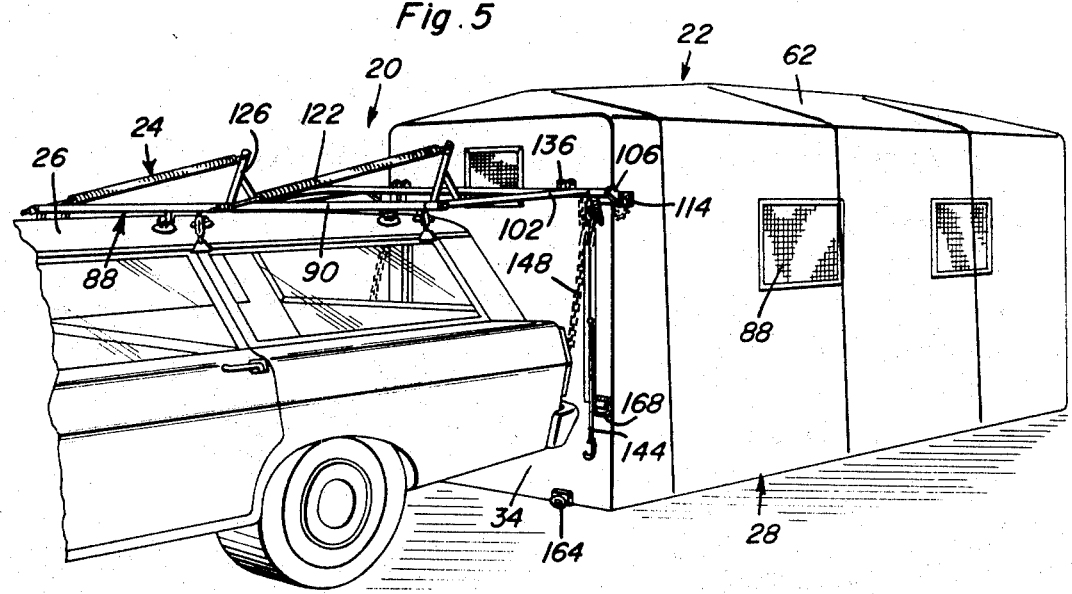
FIGURE 5 is a perspective view of the completely erected camper.

With reference to FIGURE 5, it will be noted that appropriate handles 168 or the like may be provided on the front panel 34 so as to facilitate a manipulation thereof during the loading and unloading operation.

Basically, the procedure in setting up the enclosure unit 22 of the camper involves an alignment of the rear of the vehicle with the camping site, a removal of the retaining pins 138 so as to release the positioning frame from the mounting frame 88, and an upward and rearward swinging of the positioning frame and unit 22 pivotally mounted thereon so as to vertically position the collapsed unit 22 rearwardly of the vehicle and in supported engagement on the ground. At this point, the retaining strap 144 is released and the holddown chains 148 tensioned between the lower portion of the rear of the vehicle and the cross-bar 104 so as to fix the position of the front panel 34 while the spiral frame is being expanded. Upon an expansion of the frame, the side rail sections are interlocked in linear alignment with each other, the final sections of each side rail being cammed into engagement with each other in a manner so as to stretch and tension the canvas cover. Prior to a final stretching of the canvas cover, the peak or ridge defining bars 64 are pivoted vertically so as to define a water shedding roof. The enclosure unit 22 is now ready to receive occupants with additional comfort being achievable through the positioning of floor panels which will normally have been retained against the front panel 34 within the collapsed unit. Upon a completion of the erection of the unit 22, the vehicle can be released therefrom through a pulling of the pivot defining pins 114 and a collapsing of the combination carrier and positioning unit 24 back onto the vehicle roof 26. The collapsing and mounting of the unit 22 merely involves a general reversal of the above steps.

Thus, it will be appreciated that a unique camper has been defined, the camper being entirely self-contained and both erectable and dismountable in a matter of minutes without necessitating the use of any tools or in fact any physical interconnection of elements aside from the relatively minor interlocking of the side rails and the hookup of the various chains and straps, including canvas collapsing elastic straps 70.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. In a collapsible camper, an enclosure unit comprising an expansible frame and an associated cover, said frame including a main structural member defining a series of longitudinally aligned convolution-like area enclosing portions, means interconnecting said portions for movement between a first collapsed adjacent stacked position and a second expanded longitudinally spaced position while retaining the longitudinal alignment thereof, and means for releasably locking said portions in the expanded position, said cover being flexible and fixed to said main structural member for simultaneous collapsing and tensioned expanding therewith, said structural member defining an elongated spiral forming, as a continuous construction, said convolution-like portions and said means interconnecting said portions, said portions being generally rectangular and defining opposed horizontal top and bottom bar-like support elements, and opposed vertical side bar-like support elements, the means for releasably locking said portions in the expanded position comprising at least one elongated bracing rail, said rail including a plurality of rail sections, at least one rail section being fixed to each portion and movable between a first collapsed position generally paralleling one of the bar-like elements of the corresponding portion, and a second bracing position in longitudinal locked alignment with the remaining sections generally paralleling the longitudinal axis of the expanded structural member, said convolution-like portions including a front terminal convolution and a rear terminal convolution, a generally horizontal support unit adapted for mounting on a vehicle, and positioning means pivotally engaged between said support unit and said front convolution for movement of the enclosure unit between a first horizontal position overlying and supported on said supporting unit and a second vertical position rearward of said supporting unit.

2. The construction of claim 1 wherein said positioning means comprises a pair of opposed parallel arms pivotally affixed at a first end thereof to the rear of said support unit for selective movement between a first position overlying the support unit and a second position extending rearward thereof, means pivotally affixing the second ends of said arms to the front terminal convolution for a swinging movement of the enclosure unit between a horizontal position generally overlying said arms and a vertical position relative to said arms as said arms are moved between their first and second positions.

3. The construction of claim 2 including counter-balanced means engaged between said support unit and said positioning means for counter-balancing a substantial portion of the weight of said encloure unit when moving both from the horizontal to the vertical and from the vertical to the horizontal.

4. In a collapsible camper, an enclosure unit comprising an expansible frame and an associated cover, said frame including a main structural member defining a series of longitudinally aligned convolution-like area enclosing portions, means inter-connecting said portions for movement between a first collapsed adjacent stacked position and a second expanded longitudinally spaced position while retaining the longitudinal alignment thereof, and means for releasably locking said portions in the expanded position, said cover being flexible and fixed to said main structural member for simultaneous collapsing and tensioned expanding therewith, and a plurality of elongated elastic straps, and opposed strap engaging means at selected points about the interior of said cover for engagement by the opposed ends of said straps upon a tensioning elongation of said straps whereby upon a collapsing of said main structural member and a relaxing of tension on said cover, said straps will effect an inward folding of said cover in a predetermined manner.

5. In a collapsible camper, an enclosure unit comprising an expansible frame and an associated cover, said frame including a main structural member defining a series of longitudinally aligned convolution-like area enclosing portions, means inter-connecting said portions for movement between a first collapsed adjacent stacked position and a second expanded longitudinally spaced position while retaining the longitudinal alignment thereof, and means for releasably locking said portions in the expanded position, said cover being flexible and fixed to said main structural member for simultaneous collapsing and tensioned expanding therewith, said structural member defining an elongated spiral forming, as a continuous construction, said convolution-like portions and said means interconnecting said portions, said portions being generally rectangular and defining opposed horizontal top and bottom bar-like support elements, and opposed vertical side bar-like support elements, and a plurality of angular bars, each having opposed ends thereof rotatably fixed to the top bar-like element of each portion for movement between a first position projecting above the top element to define a peaked support for the overlying portion of the cover, and a second collapsed position depending below the associated top element.

6. A portable camper comprising a car top support, a collapsible enclosure unit, and a positioning unit engaged between said support and said enclosure unit for a selective movement of the enclosure unit between a horizontal position overlying the support and a vertical position rearward of said support and any vehicle upon which said support is mounted, said enclosure unit including a rigid front panel, and an area-defining structural frame fixed to said panel and selectively expansible longitudinally rearward from said panel while retaining the area-defining configuration thereof, panel stabilizing means engaged with said panel and selectively engageable with an adjacent support mounting vehicle for a stabilization of said panel during the expansion of the frame, said frame comprising an elongated spiral member defining a plurality of generally rectangular convolutions selectively collapsible into substantial abutting engagement with each other against the panel, and expansible into substantial spaced relation to each other.

7. The construction of claim 6 including a flexible cover mounted on said frame and both expansible and collapsible therewith, and means for retaining the spiral frame member in an expanded position so as to define a habitable area.

8. The construction of claim 7 wherein said positioning unit comprises a pair of opposed parallel arms pivotally affixed at a first end to the rear of the support for a selective movement between a first position overlying the support and a second position extending rearwardly thereof, and means pivotally affixing the second ends of said arms to the panel for a swinging of the panel and the spiral member supported thereon between a horizontal position generally overlying said arms and the support, and a second position projecting vertically relative to said arms as the arms move between their first and second positions, said means pivotally affixing the second ends of the arms being completely disengageable so as to allow for a disengagement of the enclosure unit from the positioning unit and support.

References Cited

UNITED STATES PATENTS 2,907,077 10/1959 Pugsley.
3,115,362 12/1963 Spurrier.
3,390,493  7/1968 Ruby _____ 135—4

PETER M. CAUN, Primary Examiner

U.S. Cl. X.R.

135—3, 4, 5